United States Patent
Volpert

(10) Patent No.: US 9,822,874 B2
(45) Date of Patent: Nov. 21, 2017

(54) GEAR SHIFTING SYSTEM AND GEAR SHIFTING ELEMENT FOR A GEAR SHIFTING SYSTEM

(71) Applicant: ZF Friedrichshafen AG, Friedrichshafen (DE)

(72) Inventor: Bastian Volpert, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 244 days.

(21) Appl. No.: 14/443,723

(22) PCT Filed: Oct. 10, 2013

(86) PCT No.: PCT/EP2013/071177
§ 371 (c)(1),
(2) Date: May 19, 2015

(87) PCT Pub. No.: WO2014/075855
PCT Pub. Date: May 22, 2014

(65) Prior Publication Data
US 2015/0300488 A1    Oct. 22, 2015

(30) Foreign Application Priority Data

Nov. 19, 2012    (DE) .................. 10 2012 221 069

(51) Int. Cl.
| | | |
|---|---|---|
| F16H 3/38 | (2006.01) |
| F16H 63/18 | (2006.01) |
| F16H 63/30 | (2006.01) |
| F16H 63/38 | (2006.01) |
| F16D 11/00 | (2006.01) |

(52) U.S. Cl.
CPC .......... *F16H 63/18* (2013.01); *F16H 63/304* (2013.01); *F16H 63/38* (2013.01); *F16D 2011/002* (2013.01); *F16H 2063/3056* (2013.01)

(58) Field of Classification Search
CPC ......... F16D 2023/0631; F16D 23/0606; F16D 23/0612
USPC .............................. 74/339; 192/53.33, 53.34
See application file for complete search history.

(56) References Cited

U.S. PATENT DOCUMENTS

| | | | | |
|---|---|---|---|---|
| 5,251,503 A | * | 10/1993 | Morris .................... | F16H 61/32 74/335 |
| 5,544,538 A | * | 8/1996 | Takagi ................ | F16H 61/0251 137/596.1 |
| 8,689,656 B2 | * | 4/2014 | Richter ................. | F16H 63/304 192/53.33 |

(Continued)

FOREIGN PATENT DOCUMENTS

| | | |
|---|---|---|
| DE | 10 2007 046 382 A1 | 4/2009 |
| WO | WO 2012/055386 A1 | 5/2012 |

OTHER PUBLICATIONS

PCT Search Report and Written Opinion, dated Apr. 10, 2014.
German Patent Patent Office Search Report, dated Sep. 9, 2013.

*Primary Examiner* — Ha D Ho
(74) *Attorney, Agent, or Firm* — Dority & Manning, P.A.

(57) ABSTRACT

A gear shifting device, by which an axial shift movement of a shift element into a shift position is triggered through interaction of a shift pin with an associated groove-like shift gate that changes in an axial direction. The shift element features the associated shift gate, while the respective shift pin is arranged in a radially displaceable manner on a transmission component adjacent to the shift element.

9 Claims, 6 Drawing Sheets

(56) References Cited

U.S. PATENT DOCUMENTS

2001/0006921 A1 7/2001 Reik et al.
2012/0037472 A1 2/2012 Rosemeier et al.
2012/0255382 A1 10/2012 Richter et al.

* cited by examiner

GEAR SHIFTING SYSTEM AND GEAR SHIFTING ELEMENT FOR A GEAR SHIFTING SYSTEM

FIELD OF THE INVENTION

The invention relates to a gear shifting device having a first rotatably drivable transmission component on which a shift element is arranged in a torque-proof and axially displaceable manner. The shift element is axially movable into at least one shift position in which the first transmission component is coupled in a torque-proof manner with a transmission component that is arranged adjacent to it and is connectable thereon. An axial shift movement of the shift element into the shift position is from the interaction of a shift pin with at least one associated groove-like shift gate, which is designed to be changeable in an axial direction. The invention also relates to a shift element for a gear shifting device.

BACKGROUND

With stage transmissions, gear shifting devices are used in order to couple transmission components of the respective transmission with each other in a torque-proof manner for the presentation of each corresponding transmission ratio relationship. Thereby, usually one shift element is assigned to a gear shifting device, which, depending on the specific arrangement, makes a force-fitting or positive-locking coupling of the respective assigned transmission components upon actuation. Thereby, the respective shift element is typically provided in a torque-proof and axially displaceable manner on one of the two transmission components to be connected in a torque-proof manner, and is displaced into a respective shift position by means of an actuator, in which the desired torque-proof coupling is realized under the prior reduction of any possible prevailing difference in rotational speed between the two transmission components. Depending on the specific arrangement of such actuator system, such an axial shift movement of the respective shift element is thereby initiated mechanically, hydraulically, pneumatically, electrically or through mixed forms.

A gear shifting device of an automated gearbox arises from DE 196 27 980 A1, through which a first rotatably drivable transmission component can be coupled, in the form of a transmission shaft, with several transmission components that are adjacently located. In the cited case, such additional transmission components comprise gear wheels that are rotatably mounted on it. In addition, several shift elements in the form of clutch sleeves are arranged on the transmission shaft in a torque-proof and axially displaceable manner, whereas each of the clutch sleeves is composed of a ring-shaped body, which is provided on an inner circumference with an axially running toothing and is guided through such toothing to a corresponding toothing on the sides of the radial inner transmission shaft.

Each of the sliding sleeves may now, in each case, move axially between a neutral position, in which the respective sliding sleeve does not couple any of the two gear wheels, located axially on both sides, with the transmission shaft, and two shift positions in which, in each case, the transmission shaft is coupled in a torque-proof manner with one gear wheel under the prior reduction of a difference in rotational speed. Thereby, in the present case, the axial shift movements of the individual sliding sleeves are presented through an electric motor, intermediate transmission ratio stages and one shift drum in the interaction with a shift fork assigned to the individual clutch sleeves. Thereby, through the electric motor, by means of the intermediate transmission ratio stages, this brings about, on the one hand, an opening of the separating clutch upstream of the transmission shaft and, on the other hand, a corresponding turning of the shift drum at the same time.

The shift drum is provided on a radial outer side with groove-like shift gates, which are designed to be changeable in an axial direction, at least in sections, and in which one shift pin of the respective shift fork runs. If the shift drum is set in rotational motion through the electric motor by means of intermediate transmission ratio stages, the course changeable in an axial direction of the respective shift gate, through the shift pin running thereon, brings about an axial sliding movement of the respective shift fork, which is translated into a corresponding axial displacement of each corresponding clutch sleeve on the transmission shaft. As a result, the respective clutch sleeve is moved axially between its respective neutral position and one of the possible shift positions. Thereby, the shift gates on the shift drum are designed to have a course that is changeable in an axial direction in such a manner that, upon a constant rotational motion initiated by the electric motor, a sequential shifting of the individual gears of the automated gearbox takes place with the respective open separating clutch.

SUMMARY OF THE INVENTION

Based on the state of the art described above, it is a task of the present invention to make available a gear shifting device, through which at least one shift movement of a shift element for the torque-proof coupling and/or separation of the two transmission components that are otherwise able to be turned relative to each other can be realized with a compact structure. Additional objects and advantages of the invention will be set forth in part in the following description, or may be obvious from the description, or may be learned through practice of the invention.

This tasks are solved on the basis of the invention as described and claimed herein.

In accordance with the invention, a gear shifting device comprises a first, rotatably drivable transmission component on which a shift element is arranged in a torque-proof and axially displaceable manner. The shift element can be axially moved into at least one shift position wherein the first transmission component is thereby coupled in a torque-proof manner with a transmission component that is connectable thereon, and which is arranged adjacent to the first transmission component and is otherwise able to be turned relative to it. In addition, an axial shift movement of the shift element into the at least a shift position and/or from this through the interaction of one shift pin is able to be triggered with at least one associated groove-like shift gate, which is designed to be changeable in its course in an axial direction, at least in sections.

Within the meaning of the invention, a "transmission component" is generally understood to mean a rotatable or stationary component of the transmission, such as a transmission shaft, a gear wheel, a housing or a housing part, etc. In particular, at least upon the shifting of individual gears of the transmission, the respective transmission component is involved in the power transmission between an input side and an output side of the transmission. While the first transmission must necessarily concern a rotatably drivable transmission component, such as a transmission shaft or a gear wheel of a transmission ratio stage in accordance with the invention, the transmission that is located adjacent to it and is connectable thereon may likewise either be designed as a rotatably drivable transmission component, thus for example as a transmission shaft, or present as a rotatably mounted spur gear, or even as a stationary component in the form of a transmission housing or a part of a transmission housing. In the case of the first variant, the two transmission components then rotate together after the torque-proof coupling, while, in the latter case, the first transmission component is, with a torque-proof connection, fixed to it with a connectable transmission component.

Within the meaning of the invention, the shift element may be directly involved in the torque-proof connection of the first transmission component to the connectable transmission component, by, with its axial displacement in the respective shift position, it being in contact with the connectable transmission component itself, thus itself transferring a torque from the first transmission component to the connectable transmission component. Thereby, the connectable transmission component for the torque-proof coupling can be provided with an additional component, for example in the form of a coupling body, with which the shift element of the first transmission component is, upon its transfer, in torque-proof contact in the shift position. As an alternative to this, however, the additional connectable transmission component is provided with its own shift element, which is likewise provided in a torque-proof and axially displaceable manner on the sides of the connectable transmission component and is to be moved for the torque-proof coupling of the transmission components at the same time with the shift element provided on the sides of the first transmission component in an associated shift position, in which it is then coupled in a torque-proof manner to the shift element of the first transmission component.

However, as an alternative to the options specified above, the shift element may concern a component that does not directly carry out the coupling of the two transmission components, but only initiates this torque-proof coupling, without thereby itself transferring a torque. Thus, a design of the shift element as sliding piston is conceivable, which, upon a transfer into a shift position, additional components connected to the transmission components to be coupled, such as two multi-disk sets of a multi-disk pack, press together, and this brings about the coupling of the transmission components.

Finally, the gear shifting device in accordance with the invention may either be designed as a simple shifting device, with which the associated shift element is able to move from a neutral position only into a shift position, or realized as a dual shifting device, with which the associated shift element may be axially displaced from the neutral position, both in a first direction and in a second direction, into a shift position, and thereby makes a torque-proof coupling of the first transmission component with a connectable transmission component that is located adjacent to it. Furthermore, within the framework of the invention, an arrangement is also conceivable, with which there can only be a change between two shift positions; thus, a neutral position of the shift element is not possible.

In accordance with the invention, a shift element of a gear shifting device particularly features a ring-shaped body, which is provided on an inner circumference with an axially running toothing, through which the body can be guided, in a torque-proof and axially displaceable manner, through a corresponding toothing to a radial inner transmission component. It is particularly preferable that the ring-shaped body forms a circular ring and is formed by a single element, whereas, in principle, within the framework of the invention, an assembly of the body from several individual parts is conceivable. Such individual parts are then connected to each other at least in a torque-proof manner.

In principle, the shift element in accordance with the invention may also be arranged in such a manner that, in a gear shifting device, upon an axial displacement into the shift position, a positive-locking or force-fitting coupling of the two transmission components is brought about. Such shift element may be designed as a claw sleeve of a claw coupling or claw brake, as a sliding sleeve of a block synchronization, or a similarly structured component, which, after a reduction of any possible difference in rotational speed between the two transmission components, makes the positive-locking coupling. Thereby, a reduction of the difference in rotational speed is either accomplished purely through a tooth meshing of the shift element with an element provided on the sides of the additional transmission component or brought about with the assistance of intermediate components, such as synchronizer rings. In addition, the shift element may also comprise a sliding piston that, when it is displaced, presses together the clutch halves of a force-fitting clutch or brake, such as a multi-disk clutch or brake.

The invention includes the technical teaching that the shift element features, on an inner diameter and/or an outer diameter, at least one associated shift gate, while the respective shift pin is arranged in a radially displaceable manner, and the shift gate is arranged in a radially opposite manner, on the transmission component adjacent to the shift element. As an alternative or in addition to this, the shift element, on a radial inner diameter and/or a radial outer diameter, accommodates the respective one shift pin in a radially displaceable manner, whereas the at least one associated shift gate for the respective shift gate is arranged radially opposite on a transmission component located adjacent to the shift element. In addition, the respective shift pin may be moved through an associated actuator, in each case radially between an initial position and a mesh position, in which it can be introduced into the associated shift gate.

In other words, in each case, the shift pin and the associated groove-like shift gate are provided radially opposite between the shift element and a transmission component located adjacent to this. On the one hand, one of these two components, thus either the shift pin or the shift gate, is thereby provided on an inner diameter or an outer diameter, whereas the other element is, conversely to this, placed on a radial outer side or a radial inner side of the adjacent transmission component. If various axial shift movements of the shift element are initiated by such an interaction, depending on the shift pin, with at least one associated shift gate, on the sides of the shift element and one or various radially adjacent transmission components, several pairs of one shift pin and one shift gate can be provided. If there are several such pairs, different combinations are conceivable, by which the shift element, on its inner diameter and/or also on its outer diameter, accommodates several shift pins, several shift gates, or at least one shift pin and at least one shift gate. Thereby, in each case, the elements thereby opposite to these can only be provided on only one adjacent transmission component or on different adjacent transmission components, but necessarily must be arranged to be radially opposite.

The associated axial shift movement is triggered by the fact that the respective shift pin radially movable through the associated actuator is introduced into the associated shift gate such that, in accordance with the course of the shift gate changeable in an axial direction, an axial displacement of the shift element relative to the transmission component that is adjacently located is brought about. Since this axial shift movement takes place initially upon the radial displacement of the respective shift pin from the initial position into the mesh position, this axial shift movement of the shift element can be selectively introduced through the actuator. At the same time, the arrangement of the shift pin with the actuator and the provision of the shift gate in compact form is possible. Preferably, the actuator thereby comprises an electrical actuator, such that, compared to a mechanical or a hydraulic actuator system, the control of the shift element is possible with low weight and a low need for installation space. As a whole, the gear shifting device in accordance with the invention can be realized in the area of a transmission in a manner that saves space, whereas it is also the case that several shift elements can be controlled easily and independently of each other through a gear shifting device that is so designed.

In contrast to this, with DE 196 27 980 A1, the shift pins provided on the sides of the shift forks run permanently in the associated shift gates, which are arranged to be on the radial outer side of the shift drum. As a result, the individual shift element may not be individually displaced from a neutral position into a shift position, since axial shift movements of the shift elements are always rigidly carried out according to the turning of the shift drum and the respective design of the shift gates. Thus, the shifting of the gears of the automatic vehicle transmission of DE 196 27 980 A1 is effected in accordance with a rigidly predetermined shifting sequence, such that, for example, a skipping of one or more gears is not possible. Thus, this structure is suitable only for use with an automated transmission. In addition, the housing of the actuator system composed of an electric motor, transmission ratio stages, and a shift drum requires a corresponding installation space, such that, in the case of DE 196 27 980 A1, a compact actuation of the shift elements is not possible.

In the present case, it is clear to the specialist that, with the gear shifting device in accordance with the invention, for the initiation of an axial movement of the shift element up to its transfer into the at least one shift position, a relative rotational speed between the component bearing the shift pin and the component provided with the groove-like shift gate is always required, since, otherwise, the enclosing of the shift pin in the associated shift gate is not translated into an axial sliding movement. This has the consequence that, when the first transmission component is at rest, a shift movement of the shift element cannot be carried out to the extent that the opposing transmission component, which features either the respective shift pin or the associated shift gate, performs a rotational motion. Furthermore, a gear shifting device in accordance with the invention is to be provided at least with start-up gears on the input side, since, at the beginning of a start-up procedure of the motor vehicle, the output side of the respective motor vehicle transmission is at a standstill. Generally, however a gear shifting device in accordance with the invention can easily be used with all stage transmissions and thereby in particular with motor vehicle transmissions.

According to one embodiment of the invention, the respective shift pin and the associated actuator are provided at a housing placed in a manner that radially surrounds the shift element. The provision of the shift pin(s), along with the several actuators on the sides of the housing, thereby has the advantage that such components are thus provided on the sides of a stationary part, and thus the feed of control lines to the associated actuator may be simply arranged. Thus, in the case of the arrangement of the actuator as an electronic actuator, electric wires may be easily led into the area of the actuator. In addition, the arrangement of the respective shift pin on the sides of the housing results in the fact that, upon the rotation of the first transmission component, there is always a relative rotational speed between the respective shift pin and the shift gate provided on the sides of the shift element. Apart from this, however, the respective shift pin and the associated actuator may also be provided on the sides of the rotatable shift element or on a rotatable transmission component, whereas control and supply lines of the actuator are then to lead to the respective rotating component.

In an additional form of the aforementioned variant, the housing bears a first and a second shift pin, of which each pair of shift gates is assigned on the sides of the shift element. Each of such pair of shift gates consists of two shift gates linked to each other, which are each introduced into the outer diameter of the shift element. Thereby, through the first shift pin in interaction with a first shift gate of the assigned first pair of shift gates, an axial displacement of the shift element from a first shift position into a neutral position, and, in the interaction of the first shift pin with the second shift gate of the first pair of shift gates, an additional axial displacement from the neutral position into a second shift position can be brought about. On the other hand, by means of the second shift pin in interaction with a first shift gate of the assigned second pair of shift gates, an axial movement of the shift element from the second shift position into the neutral position, and in the interaction of the second shift pin with a second shift gate of the second pair of shift gates, an additional axial displacement from the neutral position into the first shift position can be presented. As a result, axial movements of the shift element between its two shift positions and its neutral position, in which a torque-proof coupling of the first transmission component with transmission components connected to it is omitted, can be controlled in a compact manner.

Thereby, the pairs of the shift gates are to be arranged to run opposite to each other, such that, with a constant direction of rotation of the shift element, through the first shift pin in interaction with the first pair of shift gates, an axial displacement of the shift element in a first axial direction, and through the second shift pin interacting with the second pair of shift gates, an axial displacement in a second axial direction oriented opposite to the first, can be initiated. Preferably, the shift gates of the two pairs of shift gates are thereby introduced, in a manner linked to each other, into the outer diameter of the shift element in such a manner that each shift gate passes steadily on its respective two ends through transition areas into the outer diameter of the body. In doing so, the respective shift pin is then also able to easily enter the respective gear shift, if this shift pin and the beginning of the respective shift gate for the beginning of the transfer of the shift pin into the mesh position are initially not overlapped in a circumferential direction.

Within the meaning of the invention, "two shift gates linked to each other" is understood to mean that, with a pair of shift gates, one end of one shift gate is located opposite to one end of the other shift gate. As a result, after exiting the one shift gate, the respective associated shift gate, to the extent that it remains extended it its mesh position, may be directly enclosed in the following shift gate of the pair of shift gates, such that the shift element is displaced directly from a shift position into the other shift position, and is only transferred to the neutral position.

However, within the framework of the invention, the shift gates of one pair of shift gates can be formed on the outer diameter in such a manner that, in the interaction with the respect shift pin, axial movements of the shift element between the neutral position and one of the shifting positions can be presented. In this case, the enclosing of the respective shift pin in a first shift gate of the respective pair of shift gates brings about a displacement from the neutral position into the respective shift position, while, through the enclosing of the same shift pin in a second shift gate of the same pair of shift gates, a reverse movement of the shift element into a neutral position is brought about. In addition, a shift pin may be assigned only one single shift gate, which, in the interaction with the shift element, enables only a displacement of the shift element between the two shifting positions. In the latter case, an approach to the intermediate neutral position would only be possible if the shift pin is drawn into the neutral position from the gate.

In accordance with an additional embodiment of the invention, the shift element on at least one axial front side possesses an inner claw toothing. In the shift position of the shift element, this inner claw toothing is in a tooth meshing with a toothing that is turned towards the inner claw toothing and arranged on a coupling body that is connected in a torque-proof manner to the connectable transmission component. In this case, the shift element is designed as a clutch sleeve, which, in the shift position, produces a positive-locking coupling of the first transmission component with the connectable transmission component through a coupling body.

Thereby, for the formation of this clutch sleeve, the inner claw toothing is appended to an axial front side, in particular to an axially running toothing, which is provided on the inner circumference of the body of the shift element. It is particularly preferable that the body of the shift element is thereby composed of a base component featuring the axially running toothing and a slide block, whereas the one slide block is front-mounted to the base component on the sides of the front side and is provided, on an inner diameter, with the inner claw toothing. Furthermore, the base component and the slide block are coupled to each other in a torque-proof manner, and may be moved axially relative to each other by means of an intermediate spring element. The subdivision of the shift element into a base component and a slide block forming the inner claw toothing, along with the coupling of such two elements by means of an intermediate spring element, thereby has the advantage that, through the axial movability of the slide block, there can be compensation for shifting effects (such as upshift scrapes, bouncing or the like) and the shocks that arise thereby.

In an additional form of the invention, a synchronizer ring is provided axially between the respective coupling body and the shift element; this is provided with a lock toothing turned towards the inner claw toothing, and, through a friction cone, is able to be brought into contact with a corresponding friction cone of the respective coupling body. Through the synchronizer ring seated between the shift element and the coupling body, a gear shifting device is thus formed in the manner of a block synchronization, with which a torque-proof connection of the first transmission component and the connectable transmission component is completed only after a reduction in the rotational speed differences. Thereby, in a manner known to the specialist, the rotational speed difference is reduced through the contact of the friction cones of the synchronizer ring and the coupling body.

An additional arrangement of the invention provides that the first transmission component is a transmission shaft, on which two gear wheels forming the connectable transmission components are rotatably mounted, whereas each of the gear wheels is coupled in a torque-proof manner with a coupling body, through which, in an assigned shift position of the shift element, a toothing meshing with the shift element is produced. In this case, two connectable transmission components in the form of two gear wheels are provided, each of which can be connected to the transmission shaft through the shift element.

The invention is not limited to the specified combination of characteristics of the equivalent claims or any of the claims dependent on them. There are also options for combining individual characteristics with one another, and as they arise from the claims, the following description of one embodiment of the invention or directly from the figures. Any reference of the claims to the drawings through the use of reference signs should not restrict the scope of protection of the claims.

BRIEF DESCRIPTION OF THE DRAWINGS

Additional measures that improve the invention are shown in more detail below, together with the description of a preferred embodiment of the invention, which makes reference to the drawings shown in the figures. The following is shown.

DETAILED DESCRIPTION

Figure 1A:
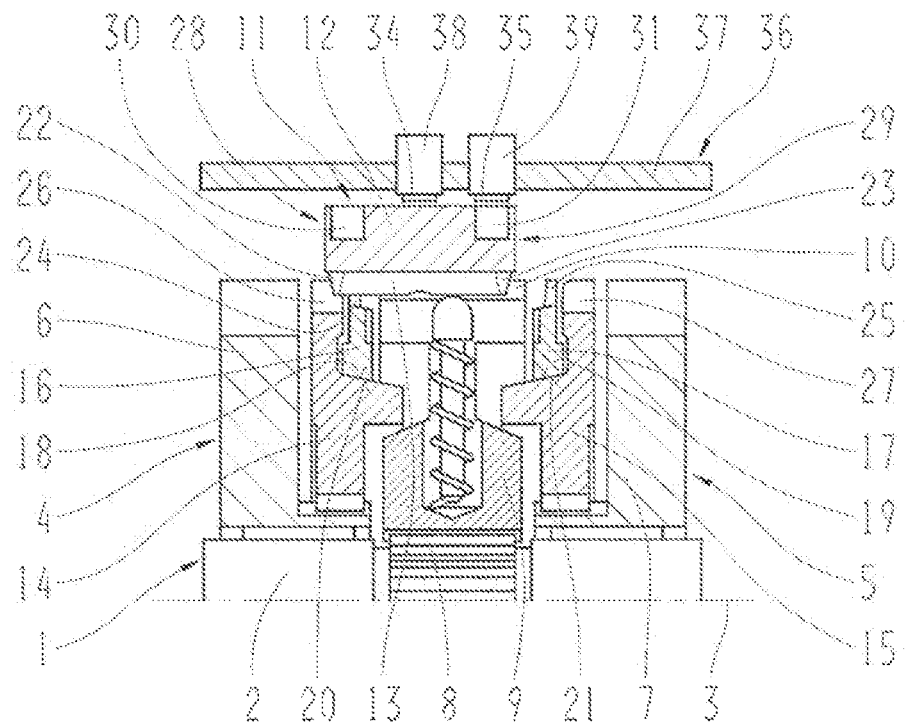
FIGS. 1A to 1I are schematic views of a gear shifting device in accordance with a first preferred embodiment of the invention, shown in different shifting states of the gear shifting device.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIGS. 1A to 1I show, in each case, a schematic view of a gear shifting device in accordance with a first preferred embodiment of the invention, whereas this gear shifting device comprises a shifting device of a stage transmission, particularly an automated car manual transmission. Thereby, FIGS. 1A to 1F show individual shifting states of this gear shifting device, whereas the basic structure of the gear shifting device is initially to be described below on the basis of FIG. 1A:

As can be seen in FIG. 1A, the gear shifting device comprises a first transmission component 1, in the form of a transmission shaft 2, which is arranged in a manner rotatable around the axis of rotation 3 and thereby bears two additional transmission components 4 and 5. The two transmission components 4 and 5 thereby concern two gear wheels 6 and 7, each of which is set coaxially to the axis of rotation 3 in a rotatable manner on the transmission shaft 2 and can be individually connected in a torque-proof manner to the transmission shaft 2, in order to couple a rotational motion of the transmission shaft 2 with a certain transmission ratio relationship with a rotational motion of a transmission shaft of the transmission running in an axial offset manner (which is not shown in the present case).

In an axial manner between the gear wheels 6 and 7, the transmission shaft 2 is also provided with a synchronization toothing 8, through which a synchronous body 9 can be guided in a torque-proof and axially rigid manner. Such synchronous body 9 in turn forms a toothing 10 on a radial outer side, on which a shift element 11 is arranged in a manner that is torque-proof and axially displaceable to the transmission shaft 2. This shift element 11 thereby features a ring-shaped, one-piece body 12, which, on an inner circumference, is equipped with a toothing 13 that engages with the toothing 10.

In addition, in an axial manner between the synchronous body 9 along with the shift element 11, on the one hand, and the respective gear wheel 4 or 5, on the other hand, in each case, a coupling body 14 or 15 and a synchronizer ring 16 or 17 are provided. Thereby, the respective coupling body 14 or 15 is rigidly connected to the respective gear wheel 4 or 5, while the corresponding synchronizer ring 16 or 17 is axially movable and to a certain degree able to be turned in respect of the synchronous body 9 between the synchronous body 9 and the respective coupling body 14 or 15. Furthermore, each of the synchronizer rings 14 and 15 is equipped, on an inner circumference, with a friction cone 18 or 19, through which the respective synchronizer ring 16 or 17 may make contact with a correspondingly designed friction cone 20 or 21 of the respective coupling body 14 or 15.

As can also be seen FIG. 1A, the shift element 11 is designed as a sliding sleeve and is thereby provided, on both the front sides turned towards the two gear wheels 6 and 7, with inner claw toothing 22 or 23 each, whereas sloped roofs of such inner claw toothings 22 and 23 are, in each case, oriented axially in the direction of the respective opposite gear wheel 4 or 5. In a radial manner at the same level as the inner claw toothings 22 and 23, lock toothings 24 and 25 are also arranged at the synchronizer rings, and toothings 26 and 27 are arranged at the coupling bodies 14 and 15, whereas the toothing 26 and the lock toothing 24 are thereby designed in a manner corresponding to the inner claw toothing 22, and the toothing 27 and the lock toothing 25 are designed in a manner corresponding to the inner claw toothing 23.

As a whole, the gear shifting device in accordance with the invention is thereby formed in the manner of a block synchronization, with which, upon an axial displacement of the shift element 11 from a neutral position into an axial direction, the synchronizer ring 16 or 17 located there first turns into a locking position, and the shift element is, through its lock toothing 24 or 25, initially prevented from a further movement. Through the contact of the respective lock toothing 24 or 25 with the associated inner claw toothing 22 or 23, the respective synchronizer ring 16 or 17 is thereby pressed with its respective friction cone 18 or 19 on the friction cone 20 or 21 of the respective coupling body 14 or 15 that is turned towards it, whereas, through the friction that thereby arises, the groups of the gear wheel 5 or 6 and the coupling body 14 or 15, on the one hand, and the transmission shaft 2, the synchronous body 9, the shift element 11 and the synchronizer ring 16 or 17, on the other hand, are synchronized with each other in their rotational speeds.

After the synchronization of the rotational speed, the shift element 11 can turn the respective synchronizer ring 16 or 17 by means of the sloped roofs of the respective lock toothing 24 or 25, and as a result, with the inner claw toothing 22 or 23 and the toothing 13, can enter the intermediate spaces of the lock toothing 24 or 25. Through the tooth meshing with the associated toothing 26 or 27 of the respective coupling body 14 or 15, a positive-locking connection between the shift element 11 and the respective coupling body 14 or 15, and thus also between the transmission shaft 2 and the respective gear wheel 6 or 7, is then formed. Under certain circumstances, in the forefront, a difference in rotational speed newly adjusted during the free-flight phase of the shift element 11 must be reduced through the roof slopes of the inner claw toothing 22 or 23 and the toothing 26 or 27, or also must turn the respective coupling body 14 or 15 together with the associated gear wheel 6 or 7.

In order to now be able to present axial movements of the shift element 11 between a neutral position and two shift positions (and in each case back), in which the respective inner claw toothing 22 or 23 is in tooth meshing with the toothing 26 or 27 turned towards it, the shift element 11 is provided, on an outer diameter of its body 12, with two pairs of shift gates 28 and 29, each of which is composed of a first, groove-like shift gate 30 or 31 and a second, groove-like shift gate 32 or 33. Thereby, the two shift gates 30 and 32, or 31 and 33, of a pair of shift gates run in a manner linked to each other on the outer diameter of the body 12, such that, in FIG. 1A to FIG. 1I, according to the turning of the shift element that is shown, only one of the two shift gates 30 or 32, or 31 or 33, can be seen.

Figure 1B:
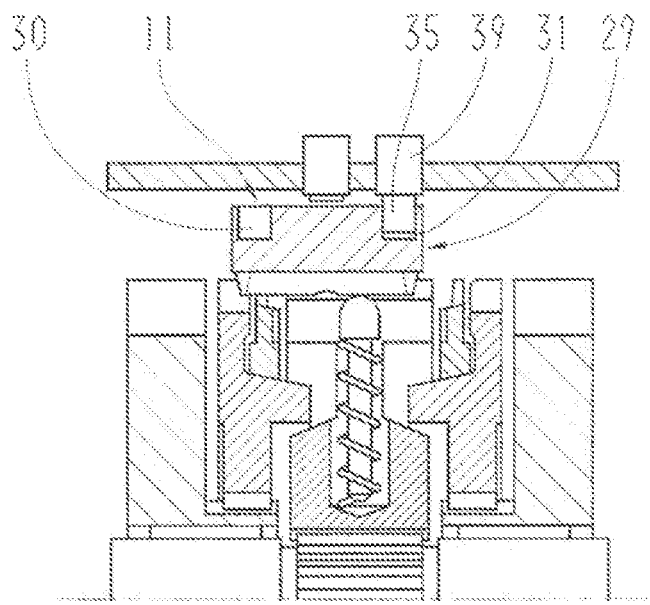
Figure 1C:
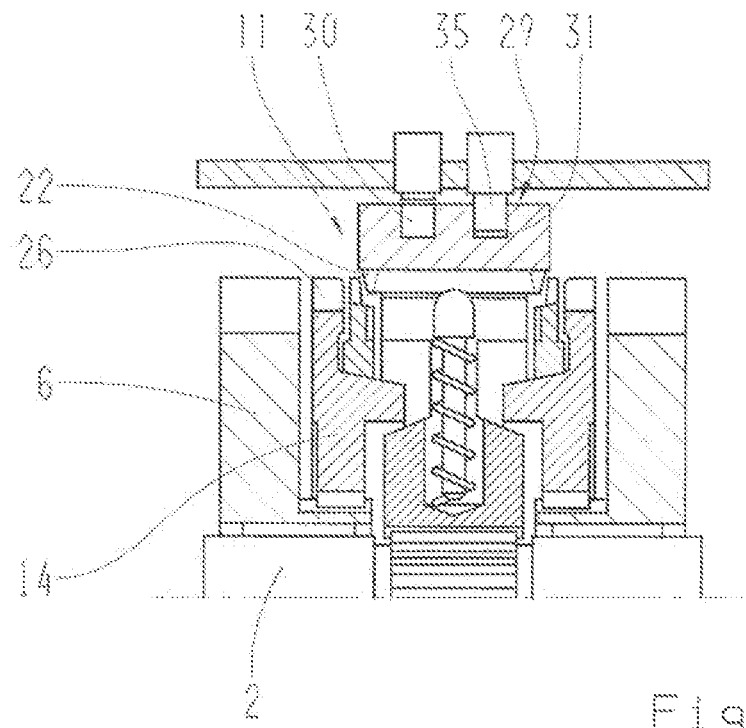
Figure 1D:
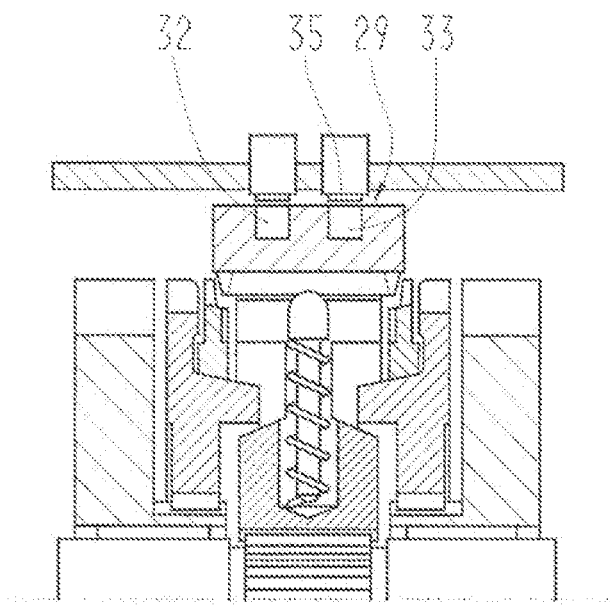
Figure 1E:
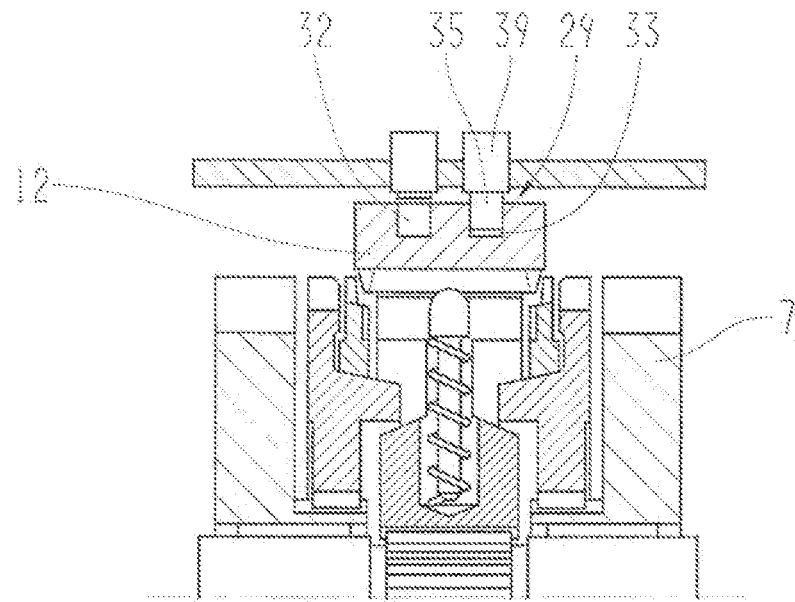
Figure 1F:
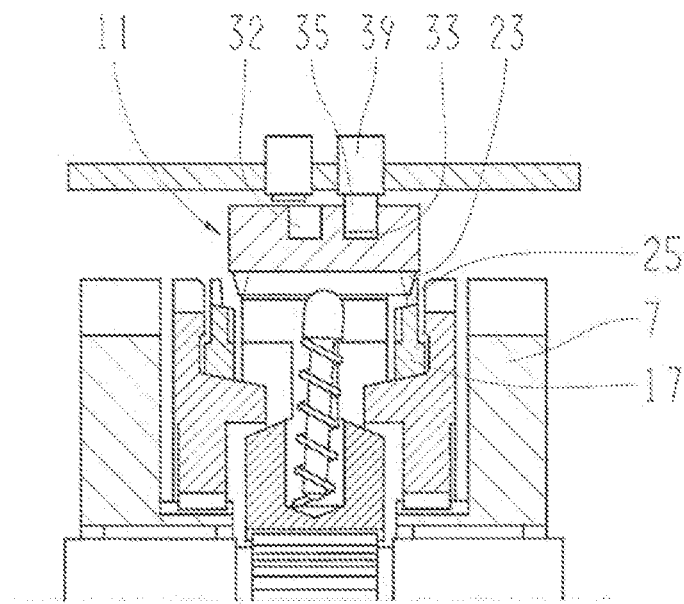
Figure 1G:
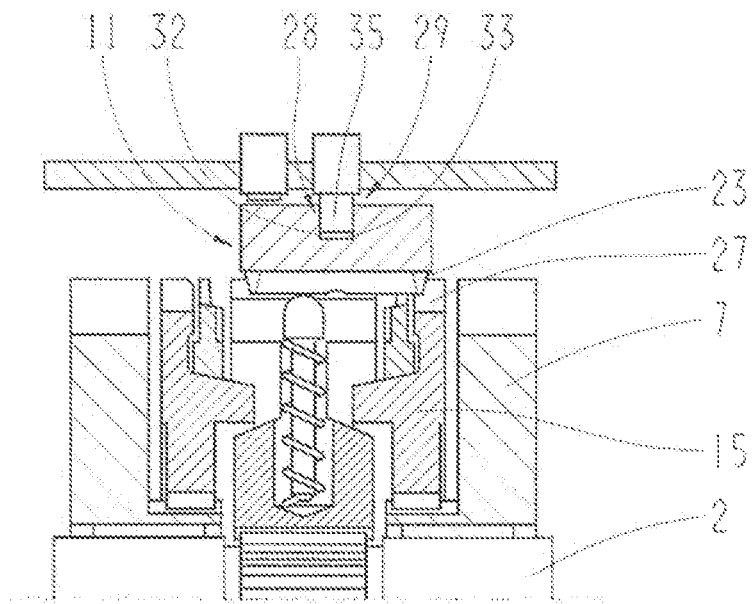
Figure 1H:
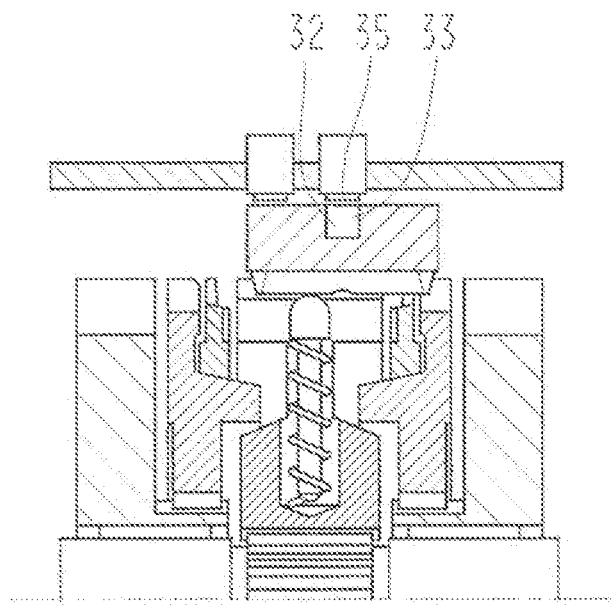
Figure 1I:
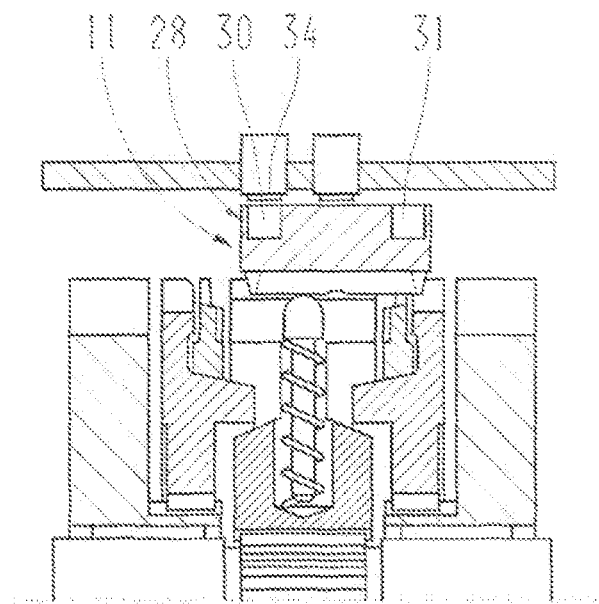
Figure 2:
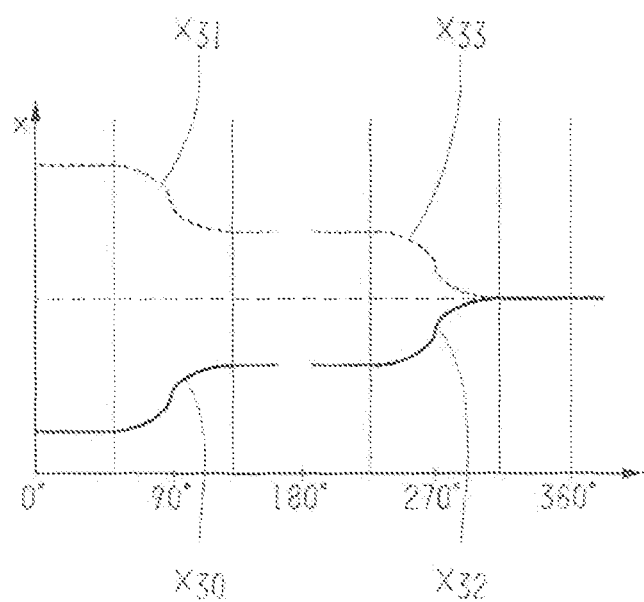
FIG. 2 is a diagram from which qualitative courses of pairs of shift gates of the gear shifting device in accordance with FIGS. 1A to 1I are shown.

Each of the shift gates 30 to 33 features a section designed to be changeable in an axial direction, which, based on the course on the outer diameter of the body 12, has a spiral-shaped character, whereas this must be seen in particular with an evaluation of FIG. 1A to FIG. 1I with FIG. 2, which in one diagram qualitatively presents the course of the shift gates 30 to 33 for the sheath of the body 12 completely unwound by 360°. Thereby, $x_{30}$ shows the course of the shift gate 30, $x_{31}$ shows the course of the shift gate 31, $x_{32}$ shows the course of the shift gate 32 and $x_{33}$ shows the course of the shift gate 33. The course of the shift gates 30 and 32 linked together and the shift gates 31 and 33 may also be inferred from FIG. 2. It also must be seen therein, as with FIG. 1G and FIG. 1H, that the shift gates 32 and 33 passes into a common end.

Figure 3:
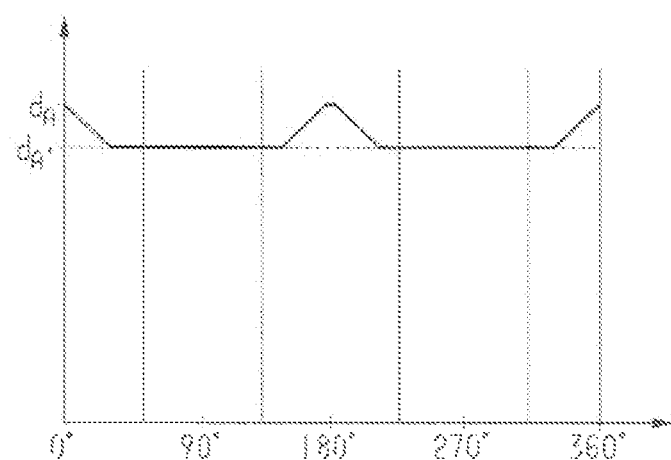
FIG. 3 is a diagram that shows, in qualitative terms, a course of diameter of a body of a shift element.

Furthermore, each of the shift gates 30, 31, 32 and 33 is provided at its end with a transition area, through which the outer diameter of the ring-shaped body 12 steadily passes into the respective shift gates 30 or 31, or 32 or 33, which are designed in groove form. Thereby, this design can be understood in particular with an evaluation of the diagram shown in FIG. 3, which qualitatively shows the course of a diameter of the body 12 upon its complete rotation and one run of the shift gates 30 and 32 of the pair of shift gates 28. As can be seen from this, the outer diameter of the body 12 designated here with $d_A$, initially in a first transition, is steadily reduced to a smaller diameter $d_A$ defining the shift gate 30, which tapers off in a second transition, at the end of the shift gate 30 back to the outer diameter $d_A$ of the body 12. Subsequently, this is accordingly repeated with a third and a fourth transition for the shift gate 32.

In the present case, the respective shift movements of the shift element 11 are introduced through the pair of shift gates 28 and 29, in each case in the interaction with an associated shift pin 34 or 35, whereas the shift pins 34 and 35 are thereby provided on the sides of a transmission component 36 located radially adjacent to the shift element 11, in the form of a housing 37 radially enclosing the shift element 11. Thereby, each of the shift pins 34 and 35 can be displaced from an initial position shown in FIG. 1A into a particular mesh position, in which the respective shift pin 34 or 35 may radially engage in one of the associated shift gates 30 or 32, or 31 or 33. For this purpose, each of the two shift pins 34 and 35 is accommodated, in a radially displaceable manner, in actuator 38 or 39, whereas the two actuators 38 and 39 are thereby designed as electrical actuators and are likewise provided on the housing 37.

In the following, on the basis of FIGS. 1A to 1I, a shift movement of the shift element 11 from a first shift position (to be seen in FIG. 1A) into an opposite second shift position is to now be described:

In order to initially move the shift element 11 from the first shift position shown in FIG. 1A, in which the shift element 11 is coupled in a positive-locking manner with the coupling body 14 and thereby the transmission shaft 2 is connected in a torque-proof manner to the gear wheel 6, into the direction of a neutral position, initially in a first step, the shift pin 35 moves by means of the actuator 39 radially from the initial position shown in FIG. 1A into a mesh position emerging from FIG. 1B, in which the shift pin 35 can be enclosed in the first shift gate 31 of the second pair of shift gates 29. If the first shift gate 31 and the shift pin 35 are not initially in an overlap state in a circumferential direction when actuating the shift pin 35, the shift pin 35 initially makes contact on the outer diameter of the shift element 11, until ultimately it can be slid into the shift gate through the respective transition area of the first shift gate 31. Subsequently, the course of the shift gate 31 changeable in an axial direction brings about the fact that, based on the fixed position of the shift pin 39, an axial displacement of the shift element 11 is forced.

Subsequently, the shift element 11 is displaced from the first shift position that is still shown in FIG. 1B into the neutral position of FIG. 1C, in which the inner claw toothing 22 of the shift element 11 is no longer in the tooth meshing with the toothing 26 of the coupling body 14. Thereby, the gear wheel 6 is no longer connected in a torque-proof manner to the transmission shaft 2, and may again rotate relative to this. At the end of the first shift gate 31 of the second pair of shift gates 29, the shift pin 35, through the transition area on the ends of the shift gate 31, moves back from this into the initial position to be seen in FIG. 1D. In this position, the shift pin 35 is also located axially at the same level with a transition area in the second shift gate 33 of the second pair of shift gates 29.

In order to carry out an additional displacement of the shift element 11 from the neutral position into its second shift position, in turn, the shift pin 35, as can be seen in FIG. 1E, is radially displaced by means of the actuator 39 from the initial position into its mesh position, and may be subsequently engaged in the second shift gate 33 of the second pair of shift gates 29. Thereby, if, at the beginning of the radial displacement of the shift pin 35, the shift gate 33 and the shift pin 35 in a circumferential direction do not overlap, the shift pin 35 initially once again makes contact on the outer diameter of the body 12, until it can enter through the transition area into the shift gate 33.

Through the section of the second shift gate 33 of the second pair of shift gates 29, which is designed to be changeable in an axial direction, the shift element 11 is displaced from the neutral position, which can still be seen in FIG. 1E, axially in the direction of the gear wheel 7, whereas, along this path, the inner claw toothing 23, with its sloped roofs, thereby initially impinges on the sloped roofs of the lock toothing 25 of the synchronizer ring 17. This state is shown in FIG. 1F. As a result, the difference in rotational speed is thereupon reduced in the manner described above.

Thereupon, the shift element 11 may be further displaced into its second shift element to be seen in FIG. 1G, and the inner claw toothing 23 with the toothing 27 may arrive in the tooth meshing, by which the shift element 11 is coupled with the coupling body 15 in a positive-locking manner, and thus the gear wheel 7 is connected in a torque-proof manner to the transmission shaft 2. Thereby, the shift pin 35 is displaced back into its initial position through the transition area on the end sides of the second shift gate 33 of the second pair of shift gates 29, which at the same time is also the transition area on the end sides of the second shift gate 32 of the first pair of shift gates 28, as can be seen in FIG. 1H. As finally shown in FIG. 1I, in the second shift position of the shift element 11, the shift pin 34 is overlapped in an axial manner with the first shift gate 30 of the first pair of shift gates 28, such that a return movement into the neutral position and, in the further course, through the interaction with the second shift gate 32 of the first pair of shift gates 28, may also thereby be carried out in the first shift position.

Figure 4:
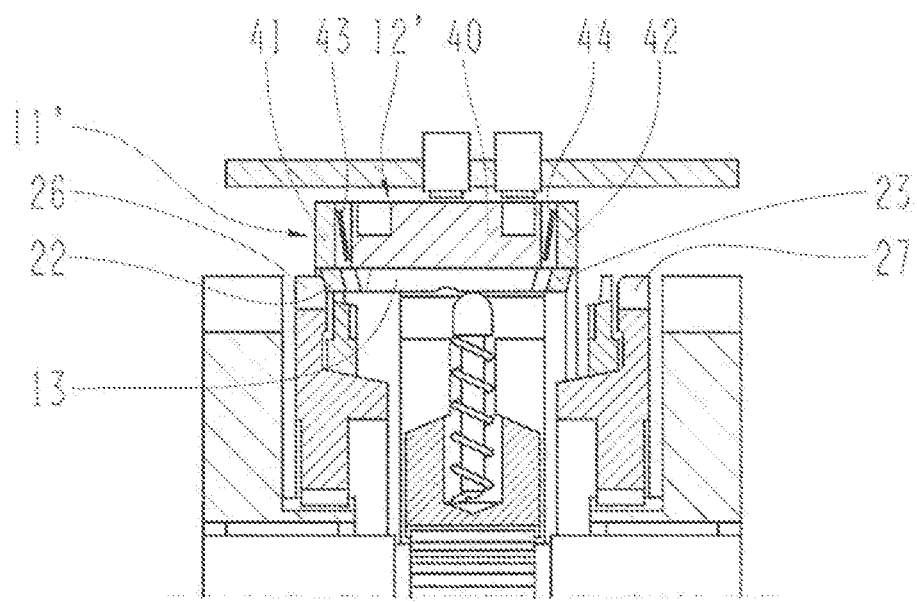
FIG. 4 is a schematic view of a gear shifting device in accordance with a second preferred embodiment of the invention.

Furthermore, a schematic presentation of a gear shifting device in accordance with the invention is shown in FIG. 4 according to a second preferred embodiment. Thereby, this corresponds to the greatest possible extent to the variant described above, whereas, as a difference, a body 12' of a shift element 11' is not designed in one piece; rather, it is composed of one base component featuring an axially running toothing 13 and two slide blocks 41 and 42. Thereby, the slide blocks 41 and 42 are front-mounted to the base component 40 on the axial front sides, and form the inner claw toothings 22 and 23 on the respective inner diameters. In addition, each of the slide blocks 41 and 42 is connected in a torque-proof manner to the base component 40, but can be moved through an intermediate spring element 43 or 44, in each case axially in respect of the base component 40. Through this respective axial movability, there can be compensation for shocks that can take place upon any repulsion of the shift element 11' upon engaging in the respective toothing 26 or 27 on the basis of shifting effects, such as bouncing or scrapes, and such shocks are thus not transferred to the base component 40. Thereby, the load of the components can be reduced.

By means of the arrangements of a gear shifting device in accordance with the invention, shift movements of a shift element 11 or 11' may be controlled in a compact manner, and accurately and independently.

Modifications and variations can be made to the embodiments illustrated or described herein without departing from the scope and spirit of the invention as set forth in the appended claims.

The invention claimed is:

1. A gear shifting device, comprising:
   a first rotatably drivable transmission component (1);
   a shift element (11; 11') arranged in a torque-proof and axially displaceable manner on the first transmission component, the shift element axially movable into at least one shift position in which the first transmission component (1) is coupled in a torque-proof manner with a connectable transmission component (4, 5) that is arranged adjacent and connectable to the first transmission component;

a transmission component (36) located adjacent to the shift element;

a first pair (28) of shift gates (30, 32) and a second pair (29) of shift gates (31,33), each of the shift gates having an axially changeable course along the shift element;

a first radially displaceable shift pin (34) associated with the first pair (28) of shift gates (28) and a second radially displaceable shift pin (35) associated with the second pair (29) of shift gates, the first and second shift pins arranged on the transmission component radially opposite to the shift gates and displaced by an associated respective actuator (38, 39) in a radial manner relative to the transmission component between an initial position and a mesh position in which the shift pin (34, 35) is introduced into one of the shift gates (30, 31, 32, 33) of the associated pair of shift gates (28, 29);

wherein:

(a) through interaction of the first shift pin (34) with the first shift gate (30) of the first pair of shift gates (28), an axial displacement of the shift element (11; 11') from a first shift position into a neutral position is brought about;

(b) through interaction of the first shift pin (34) with the second shift gate (32) of the first pair of shift gates (28), an axial displacement of the shift element from the neutral position into a second shift position is brought about;

(c) through interaction of the second shift pin (35) with the first shift gate (31) of the second pair of shift gates (29), an axial movement of the shift element (11; 11') from the second shift position into the neutral position is brought about; and (d) through interaction of the second shift pin (35) with the second shift gate (33) of the second pair of shift gates (29), an additional axial displacement of the shift element from the neutral position into the first shift position is brought about.

2. The gear shifting device according to claim 1, wherein the transmission component comprises a housing (37) that radially surrounds the shift element (11; 11').

3. The gear shifting device according to claim 1, wherein the shift element (11; 11') on an axial front side thereof has an inner claw toothing (22, 23), wherein in the shift position of the shift element, the inner claw toothing (22, 23) meshes with a toothing (26, 27) that is turned towards the inner claw toothing (22, 23) and arranged on a coupling body (14, 15) that is connected in a torque-proof manner to the connectable transmission component (4, 5).

4. The gear shifting device according to claim 3, further comprising a synchronizer ring (16, 17) provided axially between the coupling body (14, 15) and the shift element (11; 11'), the synchronizing ring provided with a lock toothing (24, 25) turned towards the inner claw toothing (22, 23) and a friction cone (18, 19) that contacts a corresponding friction cone (20, 21) on the coupling body (14, 15).

5. The gear shifting device according to claim 1, wherein the first transmission component (1) is a transmission shaft (2) on which two gear wheels (6, 7) forming the connectable transmission components (4, 5) are rotatably mounted, wherein each of the gear wheels (6, 7) is coupled in a torque-proof manner with a respective coupling body (14, 15) that is connected in a torque-proof manner to the connectable transmission component (4, 5).

6. A shift element (11; 11') of a gear shifting device comprising:

a ring-shaped body (12; 12') provided on an inner circumference thereof with an axially running toothing (13) by which the body (12; 12') is guided in a torque-proof and axially displaceable manner by engagement with corresponding toothing (10) along a radially inner transmission component (1);

a first pair (28) of shift gates (30, 32) and a second pair (29) of shift gates (31,33), each of the shift gates having an axially changeable course along an inner or outer diameter of body; and wherein a respective shift pin (34, 35) assigned to each of the first and second pairs of shift gates provided on an additional adjacent transmission component is radially displaceable into one of the shift gates of its assigned pair of shift gates to axially shift the shift element along the inner transmission component.

7. The shift element (11; 11') according to claim 6, further comprising an inner claw toothing (22, 23) provide at each axial front side of the body.

8. The shift element (11; 11') according to claim 6, wherein the body (12') comprises a base component (40) with the axially running toothing (13) defined thereon, and a slide block (41, 42) mounted to each axial front side of the base component with the inner claw toothing (22, 23) provided on the slide blocks, wherein the base component (40) and the slide blocks (41, 42) are coupled to each other in a torque-proof manner and are axially movable relative to each other by means of an intermediate spring element (43, 44).

9. The shift element (11; 11') according to claim 6, wherein each shift gate (30, 31, 32, 33) comprises a transition area with an outer diameter of the body at each end of the shift gate.

* * * * *